Feb. 24, 1970     M. OLYPHANT, JR., ETAL     3,497,383
ELECTRICALLY CONDUCTIVE ADHESIVE TAPE
Filed Aug. 22, 1967
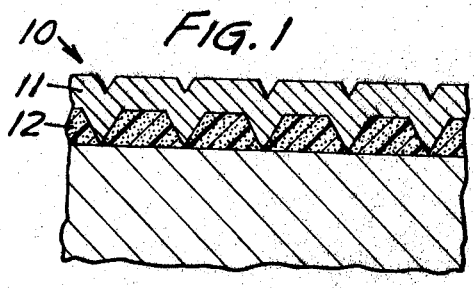
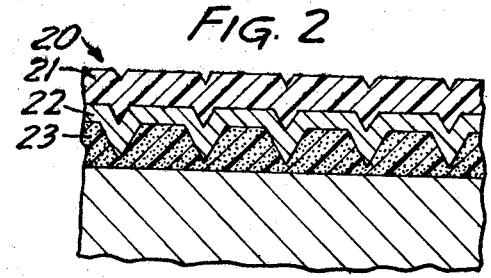
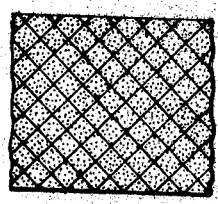
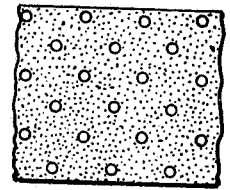
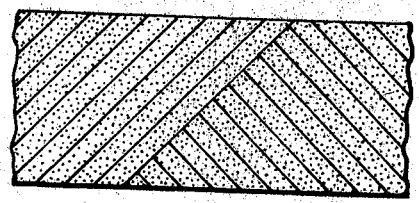
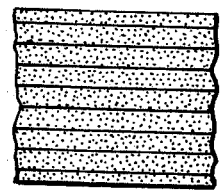
INVENTORS
MURRAY OLYPHANT, JR.
ROBERT H. STOW
BY
Carpenter, Kinney & Coulter
ATTORNEYS United States Patent Office 3,497,383
Patented Feb. 24, 1970

3,497,383
ELECTRICALLY CONDUCTIVE ADHESIVE TAPE
Murray Olyphant, Jr., East Oakdale Township, Washington County, and Robert H. Stow, White Bear Lake, Minn., assignors to Minnesota Mining and Manufacturing Company, St. Paul, Minn., a corporation of Delaware
Filed Aug. 22, 1967, Ser. No. 662,451
Int. Cl. B44d 1/18
U.S. Cl. 117—212                                    14 Claims

ABSTRACT OF THE DISCLOSURE

An adhesive tape that exhibits electrical conductivity through the tape and that comprises an electrically conductive backing formed, typically by embossing, with many integral closely spaced projections on one surface, and a layer of adhesive covering that surface of the backing and having a thickness that (a) is at least substantially as great as the height of the projections but (b) does not exceed the height of the projections by more than an amount that will readily undergo dielectric breakdown.

BACKGROUND OF THE INVENTION

The present invention follows several attempts to provide a satisfactory adhesive tape that would exhibit through-the-tape electrical conductivity—that is, through a layer of adhesive to a conductive tape backing. One of the first known patent descriptions of such a tape is Coleman, U.S. Patent 2,808,352, issued Oct. 1, 1957, in which it was suggested that the adhesive be made conductive by loading it with fine silver particles. Insofar as is known, the tape described in this patent was never successfully commercialized.

A presently commercial tape was the first adhesive tape known to the inventors to exhibit reliable through-the-tape conductivity. This tape, which was introduced several years after the issuance of the Coleman patent, is also made electrically conductive by the incorporaiton of electrically conductive particles in the adhesive. But as described in the pending U.S. patent application of Robert H. Stow, Ser. No. 486,619, filed Sept. 13, 1965, reliable conductivity through the adhesive of this tape is accomplished by the unique conditions for incorporating the particles, including use of relatively thick particles arranged in a monolayer in the layer of adhesive.

This metal particle-loaded tape has generally performed satisfactorily and has found many applications, including use as a wrapping material around electrical components to provide radio-frequency shielding, and as a short-distance electrical conductor between conductive substrates. However, it also has had shortcomings. The preparation of the adhesive for the tape and of the tape from the adhesive is somewhat exacting and involved, and thus costly. Also, while the tape has low resistance through the tape—on the order of 0.005 ohm or less per square inch—even lower resistances would be welcomed. Further, to obtain the best results with the tape it has been found that application of it should be by careful, time-consuming methods, typically using a roller to press it in place.

SUMMARY OF THE INVENTION

The tape of the preent invention comprises a flexible continuous electrically conductive backing formed on at least one surface with many integral closely spaced electrically conductive projections having a substantially uniform height. Typically, the backing is metal foil and the projections are raised in the foil by embossing it after it has been coated with adhesive. A layer of adhesive covers the surface of the tape, this layer of adhesive having a thickness that (a) is at least substantially as great as the height of the projections, but (b) does not exceed the height of the projections by more than a slight amount that has been found to readily undergo dielectric breakdown. Electrical conduction between a substrate and the conductive backing thus occurs through the projections and any adhesive covering the projections.

While the shortcomings listed for the presently commercial tape described above have not prevented its commercial success, the contrast with the tape of the present invention highlights the inferiority of the presently commercial tape. The new tape accomplishes everything and more that metal particle-loading of adhesive has accomplished, and yet it can be prepared much more simply and much less expensively. For example, the tape can be made in a single run including an initial adhesive coating and drying operation followed by the embossing operation. Much lower resistances—on the order of 0.0005 ohm or less per square inch—are provided by the new tape. Another significant advantage of the new tape is its much larger current carrying capacity arising from the fact that it contains more conductive paths through the adhesive layer. And, as noted above, the new tape requires no special methods of application.

DRAWINGS

FIGURES 1 and 2 are cross-sections through representative tapes of the invention applied to a substrate; and FIGURES 3–6 are plan views of representative tapes of the invention.

DETAILED DESCRIPTION

FIGURE 1 illustrates in cross-section a typical tape 10 of this invention, including an embossed metal foil backing 11 coated with adhesive 12. Such a metal foil backing generally has a pre-embossed thickness between about 0.5 and 3 mils and is formed from a highly conductive ductile metal, such as copper or aluminum. The embossing is usually performed as a last step after the adhesive has been coated on the backing and a liner applied over the adhesive, and in that case, the tape is conveniently embossed by passage between a pressing roll, which has a pattern of projections on its outer surface, and an even-surfaced back-up roll made from hard rubber, steel, or the like.

The tape is embossed so that the projections are pressed through or almost through the layer of adhesive, the depth of the embossing being controlled principally by an appropriate choice of the height of the projections on the pressing roll and the area of the lands (the top surface of the projections on the embossing roll), the pressure applied between the two rolls, the firmness of the back-up roll, the firmness of a back-up sheet (usually the tape liner), and the temperature of the tape during the embossing operation. Ideally, the adhesive side of the completed tape has a flat surface, with the thickness of the adhesive layer substantially as great as the height of the projections, as shown in FIGURE 1. The obtaining of a flat surface is facilitated by heating the embossing roll and the tape so that the displaced adhesive can readily flow. Any extension of the projections above the surface of the surrounding adhesive should not exceed a few hundredths of a mil.

Quite often, a shallow thickness of adhesive covers the top of the projections as shown in FIGURE 2. The thickness of this covering portion of the adhesive layer should not be greater than that which will readily undergo dielectric breakdown under the voltages and currents to which the tape is exposed. For the typical adhesive material, such as an acrylate or rubber-resin adhesive, with a potential difference between a substrate to which the tape is applied and the projections of about one volt, the extra thickness should not exceed about 0.5 mil and preferably should be less than about 0.1 mil. Where higher voltages are applied, or where there are fewer projections per unit area, or where the tape is held against the substrate with higher than normal pressures (for tests, we have used as a normal presure about 5 pounds per square inch, for example), larger thickness can be tolerated. It will also be recognized that if the adhesive itself can be made conductive to some degree (other than by loading with metal particles), larger thicknesses can be tolerated.

The height of the projections, which for normal purposes are substantially uniform in height, is mainly determined, in view of the above considerations, by the thickness of the adhesive layer. An adhesive-covered projection of very low height, as about 0.1 mil, is sufficient to promote the dielectric breakdown that produces satisfactorily low electrical resistances; but a more typical height is 2 to 2.5 mils. The projections illustrated in cross-section in FIGURE 1, which substantially taper to a point, are most preferred since they permit a large percentage of the surface of the tape to be comprised of adhesive. Further, since conduction often occurs by a process of dielectric breakdown through adhesive covering the tops of the projections, projections that taper toward the top so that they have a small land area are desirable to concentrate the field on a charge traveling through the adhesive.

FIGURES 3–6 illustrate some of the variety of patterns and shapes of projections that may be formed in the tape. The line-shaped projections and intermeshing pattern shown in FIGURE 3 (known as a quadgravure pattern, the sets of parallel lines crossing at a 90 degree angle and being arranged 45 degrees from the vertical) are verferred since a high concentration of projections is achieved and yet the tape exhibits good adhesion. Whatever the pattern, it is desirable that the projections be closely-spaced, so that the tape may be applied against electrodes or substrates having a small area of contact; generally the spacing between the projections is between about 15 and 200 mils, preferably between about 25 and 100 mils.

Beside metal foil backings, embossed metal-coated plastic films, such as aluminum-coated polyethylene terephthalate, may also be used as backings in tapes of this invention. FIGURE 2 illustrates a tape 20 having an embossed plastic film 21, coated with metal 22 as a buckling, with the backing being coated with adhesive 23. Such a tape has the advantage that the film 21 insulates and protects the conductor 22. Conductive papers and cloths and metallized cloths also find application in tapes of this invention, insofar as they may be formed with projections on one surface. The conductivity of the backing should be as high as is consistent with other requirements; in general, to achieve a product having useful conductivity, the conductive portion of the backing should have an electrical resistivity of not more than 1000 ohm-centimeters.

While embossing is at present the most inexpensive and convenient procedure for forming the necessary projections in a tape backing, the projections may be formed in other ways also. For example, plastic film may be cast onto a roll having a series of depressions that form the necessary elevations or projections in one surface of the cast film. Metal foils may also be passed between forming rolls, with one or both of the rolls having a series of depressions by which projections are formed in the metal foil. Projections are also formed on backings of tapes of this invention by etching processes.

Any adhesive material capable of the needed adhesive properties may be used in the tape of the invention so long as it is compatible with the material of the backing on which it is coated. Under usual conditions the adhesive with the lowest dielectric strength will be desired. While pressure-sensitive adhesives are the most common, activatable adhesives such as heat- or solvent-activated adhesives, are also used. As described in the pending Stow application mentioned above, S.N. 486,619, long-lived, compatible associations of adhesive material with an oxidizable base metal such as copper may be obtained through incorporation into the adhesive material of a combination of antioxidants and chelating-type inhibitors.

It is contemplated that the tapes of this invention will usually have normal home voltages (110 or 220 volts) or less imposed upon them. In fact, the tape will give satisfactory performance when higher voltages are imposed, as long as the heat developed by the current passing through the tape is not so much as to cause rapid degradation of the adhesive or backing. Preferred tapes will satisfactorily conduct under the imposition of very low voltages, on the order of $10^{-5}$ volts, for example.

Of the presently existing and contemplated uses for the tapes of this invention, the most useful are those with an electrical resistance through the tape less than about 0.01 ohm per square inch, and preferably less than 0.001 ohm per square inch. However, where the tape is intended for some use as a path for static charges to be drained away, it may be less conductive, having a resistance even as high as 100 ohms per square inch, for example. It will be recognized that the resistance of a tape of this invention can be tailored for a particular job, from resistances higher than 100 ohms per square inch to the more common very low resistances.

The invention is further illustrated in the following examples:

Example 1

A length of dead-soft copper foil weighing one ounce per square foot (about 1.3 to 1.4 mils in thickness) was coated on one surface with a pressure-sensitive adhesive consisting of 100 parts of a copolymer of isooctyl acrylate (96 mol percent) and acrylamide (4 mol percent); 3 parts of 4,4 thio-bis (6 tert-butyl meta cresol) (Santonox R); and one part of disalicylal-propylene diamine (Copper Inhibitor 50). These ingredients were dissolved in ethyl acetate as a 22 weight percent solids solution, and this solution was knife-coated on the copper foil. The coated foil was dried in an oven for 1½ minutes at 130° F. and for 1½ minutes at 200° F., whereupon the weight of the adhesive was 37.2 grams per square meter and the thickness of the adhesive was 1.7 mils. The tape was then wound with a flat silicone-treated paper liner having an approximately 40 pound basis weight.

This tape, including liner, was then embossed by passing it between a 6-inch diameter metal roll heated to 385° F. and a 6-inch diameter hard-rubber roll having a Shore A durometer reading of 70. The tape traveled about 100 feet per minute and the pressure between the rolls was about 152 pounds per inch width at the nip. A 16 quadgravure pattern of raised lines (the pattern shown in FIGURE 3, with the line-shaped projections being 1/16 inch apart, 17 mils high and 5 mils wide at the top) was on the outside surface of the metal roll, and the metal foil was pressed against that surface. The tape was preheated before embossing by causing it to travel against the heated roll for about the last 13 inches before it entered the nip between the metal and rubber rolls. The height of the projections on the embossed tape was about 2.3 mils, the tape having a total thickness of about 3.7 mils. Measurement (with a drop-head micrometer in the method described in ASTM D–1000) of the thickness of the tape before and after dissolving of the adhesive revealed that about 0.02 mil of adhesive covered the tops of the projections.

The resistance through the tape was measured by first laying the tape on a gold-plated brass electrode having a surface area of one square inch, adhesive side up. A second gold-plated brass electrode having a surface area of one square inch was then laid on the adhesive side of the tape in alignment with the first electrode and a weight was applied to the top electrode sufficient to produce a pressure of 5 pounds per square inch. An electrical power supply was connected across the electrodes, and a rheostat in the circuit adjusted so that the power supply delivered 0.1 ampere. A volt meter, also connected across the electrodes, measured the voltage drop from which the resistance was calculated.

Using this method it was found that the embossed tape of this example exhibited an average resistance of 0.0005 ohm per square inch. Pressure sensitive adhesion, measured by the method disclosed in ASTM D–1000, was 35 ounces per inch width of tape.

Example 2

Polyethylene terephthalate film, one-mil thick, was embossed on a rotogravure press that had a metal pressing or printing roll with a standard 16 inverted pyramidal pattern of projections on its outside surface (the pyramids being 22 mils high and 44 mils wide at the base and aligned in parallel rows, each pyramid in a row being spaced 1/16 inch apart and each row being spaced 1/32 inch and offset from adjacent rows) and a hard-rubber back-up roll. This embossing step produced a pattern of dots raised on one side about 0.2 mil in height. The embossed film was then vapor-coated on the side with the raised dots with a layer of aluminum having a thickness such that the layer had a surface resistivity of one ohm per square. Knife coating, with the orifice set at 3.0 mils, was used to coat the aluminum side of this backing with the solution of pressure-sensitive adhesive used in Example 1; the coated backing was dried and wound with a liner also as described in Example 1. The dry adhesive coating covering the tops of the projections was about 0.17 mil thick.

The adhesion of the tape was measured as 21 ounces per inch width of tape. Two 3/4-inch by 1-inch rectangular electrodes with a voltage impressed between them of 1.5 volts were placed with a pressure of 5 pounds per square inch one inch apart against the adhesive side of a one-inch wide strip of the tape, and the resistance between the two points found to be about 30 ohms.

Example 3

Dead-soft aluminum foil, two mils in thickness, was knife-coated with a polyester formed from terephthalic acid, ethylene glycol, and neopentyl glycol (Vitel PE 207 made by Goodyear Tire and Rubber Co.). Before it was coated the polyester was dissolved in a mixture of 20 weight percent methyl ethyl ketone and 80 weight percent toluene to give a 20 weight percent solids solution. The coated foil was dried as in Example 1 and wound with the same liner, the dry thickness of the adhesive layer being 1.2 mils (26.5 grams per square meter). The resulting tape was embossed with a 16 quadgravure pattern as described in Example 1, except that the tape traveled between the rolls at a speed of 46 feet per minute and the pressure on the tape at the nip was 128 pounds per inch width. The embossing increased the thickness of the tape from 3.2 to 3.5 mils, with the height of the projections being about 1.2 mils; it was estimated by the method of Example 1 that there was 0.24 mil of adhesive overlying the projections.

Electrical resistance was measured through the tape by the method described in Example 1 and was found to average 0.52 ohm per square inch. The adhesion of the tape was measured by the method described in ASTM D–1000 except that the adhesion plate was heated to 355° F. before the tape was applied; after the tape was applied to the plate, the assembly of plate and tape was immediately allowed to cool 30 minutes to room temperature. The adhesion was then measured as 50 ounces per inch width of tape.

Example 4

A thermosetting pressure-sensitive adhesive was prepared consisting of:

| | Parts by weight |
|---|---|
| Natural rubber | 100 |
| Zince oxide | 20 |
| Heat treated wood rosin having a melting point of 74° C., an acid number of 151, and a saponification number of 157; the unsaponifiable ingredients comprising 16 percent by weight of the rosin (Tenex) | 20 |
| A polyterpene polymer of the pinene type softening at 115° C. (Piccolyte S–115) | 60 |
| An oil-soluble heat-reactive phenol - formaldehyde resin based primarily on tertiary butyl phenol (CKR 1634) | 20 |

These ingredients were mixed and heated in a Mogul mixer to partially react them and then dissolved as a 24 weight percent solids solution in heptane. This solution of adhesive was then knife-coated on dead-soft aluminum foil, two mils thick, and the coated foil was dried and wound with a liner as in Example 1. The dry thickness of the adhesive was 1.4 mils.

This tape was embossed with a 16 quadgravure pattern by the method and with the rate of travel and pressure at the nip used in Example 3. The height of the projections formed was about 2.2 mils, and about 0.13 mil of adhesive was measured above the projections.

Electrical resistance through the tape, measured by the method described in Example 1, was 0.024 ohm per square inch. Pressure-sensitive adhesion of the embossed tape, measured by the method of ASTM D–1000, was found to be 34 ounces per inch width of tape.

It will be recognized that tapes made from a metal-coated plastic film backing may not conduct electricity to the exterior surface of the backing. However, for purposes of this specification these tapes are regarded as being electrically conductive through the tape, since conduction occurs from a conductive substrate to the conductive portion of the backing.

We claim:

1. An electrically conductive adhesive tape comprising (1) a flexible continuous electrically conductive backing embossed with many integral electrically conductive closely spaced projections of substantially uniform height on at least one surface, and (2) a layer of adhesive covering said surface of the backing and having a thickness that (a) is at least substantially as great as the height of the projections, but (b) does not exceed the height of the projections by more than an amount that will readily undergo dielectric breakdown when a useful voltage is imposed between the tape and a conductive substrate to which the tape is applied.

2. The tape of claim 1 in which the backing includes a continuous layer of highly conductive metal disposed against the adhesive layer.

3. The tape of claim 1 in which the projections comprise line-shaped projections.

4. The tape of claim 1 in which the projections comprise two sets of parallel line-shaped projections, the projections of one set intermeshing with those of the other set.

5. The tape of claim 1 in which adjacent projections are spaced apart between about 15 and 200 mils.

6. The tape of claim 1 in which the projections taper toward the top.

7. The tape of claim 1 in which the adhesive is a pressure-sensitive adhesive.

8. The adhesive tape of claim 1 in which the backing consists essentially of a self-supporting conductive metal foil backing.

9. The adhesive tape of claim 1 in which the backing comprises a thin layer of conductive metal coated on an organic polymeric film.

10. The tape of claim 1 in which the layer of adhesive does not exceed the height of the projections by more than 0.1 mil.

11. A method for conducting electricity from a conductive substrate comprising (A) adhering to the substrate a tape that includes (1) a flexible continuous electrically conductive backing embossed with many integral electrically conductive closely spaced projections of substantially uniform height on at least one surface, and (2) a layer of adhesive covering said surface of the backing and having a thickness that (a) is at least substantially as great as the height of the projections, but (b) does not exceed the height of the projections by more than an amount that will readily undergo dielectric breakdown under a useful potential difference imposed between said substrate and conductive backing; and (B) imposing a useful potential difference between said substrate and conductive backing.

12. A method for making an electrically conductive adhesive tape comprising (1) applying a layer of adhesive to a deformable backing that at least includes an exterior continuous layer of conductive metal, the adhesive being disposed over the metal layer, and (2) embossing the coated backing to form many integral electrically conductive closely spaced projections of substantially uniform height, the thickness of the adhesive layer after the embossing operation (a) being substantially as great as the height of the projections, but (b) not exceeding the height of the projections by more than an amount that will readily undergo dielectric breakdown under a useful voltage imposed between the tape and a conductive substrate to which the tape is applied.

13. The method of claim 12 in which the backing consists of a metal foil.

14. The method of claim 12 in which the thickness of the adhesive layer after the embossing operation does not exceed the height of the projections by more than 0.1 mil.

References Cited
UNITED STATES PATENTS 2,808,352  10/1957  Coleman _____ 117—122

WILLIAM L. JARVIS, Primary Examiner

U.S. Cl. X.R.

117—122, 217, 230; 161—119, 128